United States Patent
Unger

(10) Patent No.: US 7,020,287 B2
(45) Date of Patent: Mar. 28, 2006

(54) METHOD AND SYSTEM FOR KEY INSERTION FOR STORED ENCRYPTED CONTENT

(75) Inventor: Robert Allan Unger, El Cajon, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 305 days.

(21) Appl. No.: 10/262,465

(22) Filed: Sep. 30, 2002

(65) Prior Publication Data
US 2004/0062398 A1 Apr. 1, 2004

(51) Int. Cl.
*H04L 9/00* (2006.01)
*H04N 7/167* (2006.01)

(52) U.S. Cl. ............. 380/277; 380/201; 380/286; 380/44; 380/47; 380/279; 380/278

(58) Field of Classification Search ............. 380/277, 380/201, 286, 44, 47, 279, 278
See application file for complete search history.

(56) References Cited

U.S. PATENT DOCUMENTS

| | | | | |
|---|---|---|---|---|
| 5,825,876 A | | 10/1998 | Peterson, Jr. ............. 380/4 |
| 6,157,719 A | * | 12/2000 | Wasilewski et al. ........ 380/210 |
| 6,381,331 B1 | | 4/2002 | Kato ............. 380/37 |
| 6,480,664 B1 | * | 11/2002 | Ting et al. ............. 386/6 |
| 6,633,564 B1 | * | 10/2003 | Steer et al. ............. 370/389 |

* cited by examiner

*Primary Examiner*—Matthew Smithers
*Assistant Examiner*—Courtney Fields

(57) ABSTRACT

An encrypted content transport stream is received by a viewer's device and recorded for subsequent playback. During recording, keys in headers of packets of the stream are stripped and placed in sequence in a table. Also, the table indicates changes in key indicating bits. When it is desired to play the content, start-of-frame indicator bits such as PUSI and/or RAI bits are used to access the table of keys to retrieve the keys necessary to decrypt the transport stream packets sought to be played.

30 Claims, 2 Drawing Sheets

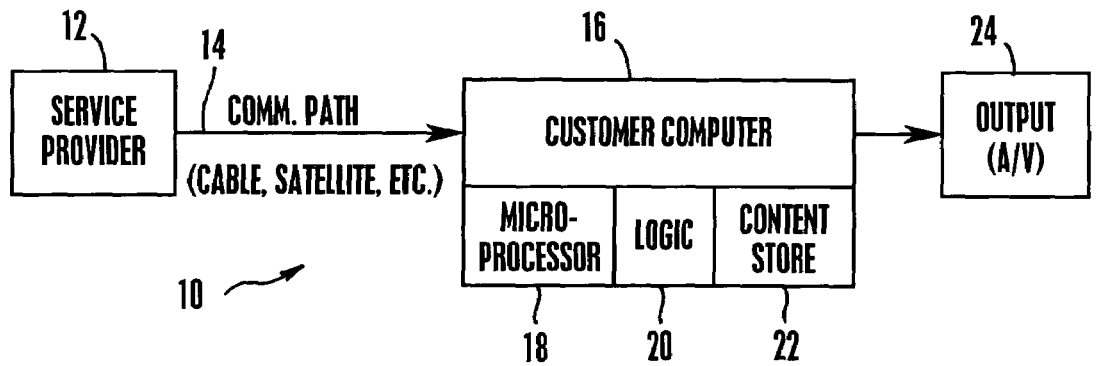
Fig. 1
Fig. 2 record logic
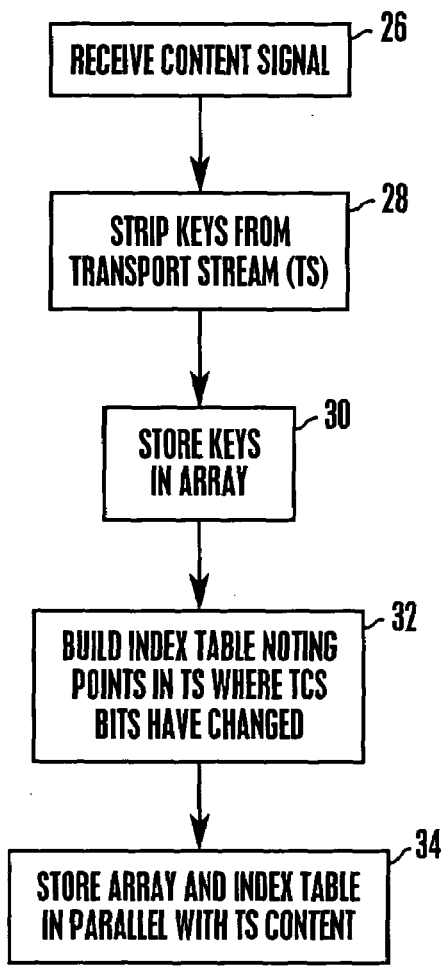

METHOD AND SYSTEM FOR KEY INSERTION FOR STORED ENCRYPTED CONTENT

I. FIELD OF THE INVENTION

The present invention relates generally to encrypted content.

II. BACKGROUND OF THE INVENTION

Content such as music, movies, and the like can be provided over cable or satellite for recording and playback by viewers. To protect the rights of content providers, the content may be encrypted. Only authorized viewer devices are given the decryption information (e.g., decryption keys) that is necessary to unlock and play the content.

As an example, an audio-video frame of data (with thirty or so frames making up one second of an audio-video program) might be sent to a viewer device in packets that make up a so-called "transport stream" (TS). Each packet can be, for instance, 188 bytes long, with each packet potentially being encrypted separately from the other packets.

In one current implementation, each packet can include a header portion. In the header portion, an encryption-indicating bit group referred to as a "transport scrambling control" (TSC) group can be included to indicate whether the particular packet is encrypted and if so, whether the "polarity" of the encryption key to be used is even or odd. Essentially, keys can be provided in pairs, with one key being designated "odd" and the other key "even". The keys themselves may be provided in the header of an encrypted packet in an "entitlement control message" (ECM). Also included in the header can be bits that indicate whether the packet contains the start of a frame. In one current non-limiting implementation these bits can be referred to as "payload_unit_start_indicator" (PUSI) bits and/or "random_access_indicator" (RAI) bits.

The keys ordinarily are encrypted. To unlock the content, the key for a sequence of packets must first be decrypted and then used to unlock the actual A/V data in the packet which is associated with the key. To facilitate timely decryption, the key that corresponds to a sequence of packets can be provided in an ECM packet that precedes the sequence of packets, so that a key may be authorized, decrypted and ready for use when the packets to which it applies are to be unlocked.

While the above-described content encryption method is effective, the present invention makes the following critical observations. It is sometimes the case that content is downloaded and recorded for later playback by a viewer. It is further the case that the content may be speculatively downloaded, i.e., sent in an encrypted form to a viewer's device for later decryption and playback once the viewer has paid for the content and has received the necessary key decryption information. Still further, the present invention recognizes that it is desirable to provide "trick mode" playback, i.e., to allow a viewer to fast forward through the content, pause, reverse, etc., i.e., to play the transport stream at a rate or in a direction or even in a packet sequence other than envisioned for normal playback mode. The present invention understands that such trick mode playback, particularly in the case of speculatively recorded content, poses complications in coordinating the decryption process discussed above, particularly in knowing what keys are required for the frame being jumped to and in having the keys ready on time to decrypt the content just prior to its being played.

SUMMARY OF THE INVENTION

A method for playing content embodied in a transport stream, wherein at least portions of the content are received in an encrypted form, includes establishing at least one table of keys received in the transport stream. For at least one packet of the transport stream, the method includes decrypting the packet and playing the packet at least in part by accessing the table to identify at least one key associated with the packet, and using the key to decrypt the content.

In a preferred non-limiting embodiment, the keys are contained in ECM packets in the transport stream, and the method includes stripping the keys from headers and placing the keys in the table. The keys may be encrypted, such that the keys can be decrypted after the act of accessing the table and prior to using the keys to decrypt the content. In a non-limiting embodiment, each packet is one hundred eighty eight (188) bytes in length. In any case, the table can be accessed based on a start-of-frame indicating bit associated with the packet sought to be decrypted, to facilitate trick mode playback.

With further regard to trick mode playback, as set forth in detail below, the table can include encryption-indicating bits that are received in headers of packets of the transport stream. When a user-initiated trick mode jump from a first video packet to a second video packet is received, it is determined whether the associated TSC bits indicate a change in polarity. If not, the polarity of the encryption-indicating bits following the jumped-to packet is reversed. A computer program device for executing the method is also disclosed.

In another aspect, a playback device includes a content store configured for holding encrypted content. The content includes a transport stream of content data packets, and some packets include keys. A processor accesses the store and is programmed to arrange the key in a key table and to link keys in the table with key changes in the transport stream, to facilitate subsequent decryption and playback of the content.

In still another aspect, a system for providing to viewers trick playback of encrypted content includes a content provider transmitting at least one encrypted transport stream, and at least one viewer device receiving the transport stream, stripping encryption keys therefrom, and linking the keys to corresponding packets of the transport stream, such that subsequent decryption and trick mode playback is facilitated.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the recording logic;

DETAILED DESCRIPTION OF THE PREFERRED EMBODIMENT

Figures 3, 4:
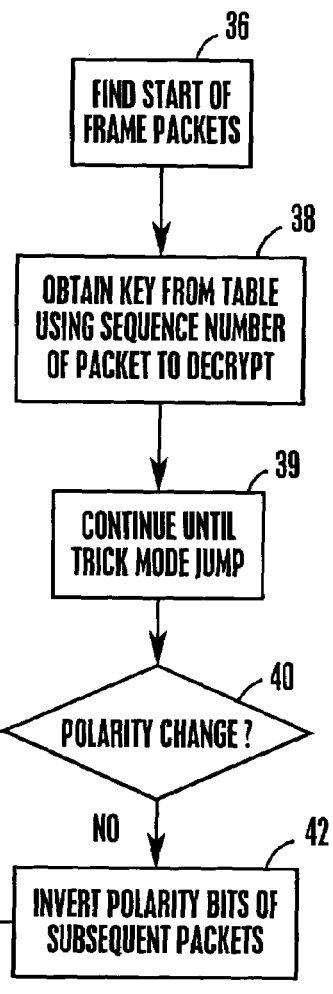
FIG. 3 shows an exemplary non-limiting key table.
FIG. 4 is a flow chart of the playback logic.

The below description discusses a system that can be considered to have two phases, namely, a recording (storage) phase and a playback (retrieval) phase. Recording typically is initiated by the service provider, e.g., on speculation that a customer will want to view the content of the stream. Then, playback later can be initiated by the customer after paying for the content.

Referring initially to FIG. 1, a system is shown, generally designated 10, that includes a content provider 12 which may also be thought of as a service provider. The content provider 12 transmits encrypted content such as music and/or audio-video content such as movies or television shows in the form of a transport stream along a communication path 14. The communication path 14 can be any wired or wireless path such as but not limited to cable TV, satellite, etc.

The content is received by a customer computer or device 16. The computer or device 16 may be a home entertainment unit (e.g., a set-top box), a TV, TV system, PC/laptop, radio, or other device. The customer computer or device 16 includes a processor 18 that accesses a logic module 20 to execute the logic disclosed below. Content is stored in a content store 22, such as but not limited to a hard drive, solid state memory, tape drive, CD/DVD, etc. for subsequent playback of the content on an output device 24 as described below. In the preferred embodiment it is assumed that data from the content store 22 must be decrypted and decoded before being sent to an output device 24. The output device 24 can be, without limitation, a TV, a monitor, a speaker, a printer, a large screen display, or other appropriate device.

In a preferred non-limiting embodiment, for illustration it is assumed that the content may have been speculatively stored, i.e., downloaded in an encrypted form before the viewer is provided with an opportunity to pay for the content and receive the necessary key decryption information. Or, the viewer may already possess the necessary information. How the user pays for and otherwise obtains this information is undertaken in accordance with principles that are unrelated to the present invention.

Record Phase:

FIG. 2 shows the logic that is executed by the processor 18 during the record phase. At block 26, the content is received from the content provider 12. In one preferred, non-limiting embodiment, the content transport stream may be received in a series of packets, each of which can be, e.g., one hundred eighty eight (188) bytes in length. Each packet may include a header that contains, among other things, a packet ID that is used to differentiate packets that belong to one program/stream from packets belonging to other programs/streams. The header may also contain encryption indicating bit groups such as the two-bit group known as "transport scrambling control" bits that indicate whether the particular packet is encrypted and if so, whether the "polarity" of the encryption key to be used is even or odd. Some packets that have special IDs (indicating they pertain to a particular sequential group of packets) can also contain an "entitlement control message" (ECM) that can include one or more key pairs, with each key in a pair having an "even" or "odd" polarity.

The header may also contain bits which indicate whether the packet contains the start of a video frame. In a non-limiting implementation these bits can be referred to as "payload_unit_start_indicator" (PUSI) bits and/or "random_access_indicator" (RAI) bits. The keys in the ECM apply to transport stream packets about to received, i.e., keys are provided in advance of the packets in which they are used to decrypt content in accordance with principles known in the art.

At block 28, the keys are stripped from the ECM packets, and at block 30 they are stored in a table as shown in FIG. 3. The data in the stream after ECM key stripping is stored separately in the content store 22.

Also, at block 32 an index is built that essentially notes points in the video portion of the transport stream for the program of relevance where the encryption indicating bits (e.g., TSC bits) have changed, indicating a change in encryption keys. At block 34, since the ECM messages indicate the packets to which they apply (recall that an ECM packet generally contains a key pertaining to a subsequent packet or packets) the keys and TSC bits can be stored in parallel. Stated differently, the keys in the table can be linked to the corresponding TSC bits to which they apply (and, hence, to the transport packets to which they apply). While the data structures are referred to herein as "tables" and "arrays", it is to be understood that other structures can be used in accordance with present principles.

As shown in the exemplary non-limiting data structure of FIG. 3, the TSC bits can be used to build a table of keys extracted from ECM packets and stored as a function of time or as a function of the number of packets that have been received. While FIG. 3 shows a single data structure, two or more structures holding the data shown in FIG. 3 can be constructed and linked together if desired.

As shown, the left column of FIG. 3 indicates the video packet number for a program received in the transport stream, either by number or by time or both. In any case, the packets are listed in the sequence they are to be played, from top to bottom. For each packet, its PUSI bits (indicating whether the packet represents a start of a frame) and TSC bits (indicating the key polarity for that packet) are set forth in the right column. Interspersed at the appropriate times/packet numbers are the ECM keys that were stripped out of the stream. More specifically, the keys are stored in parallel or otherwise correlated with packets that indicated a polarity change (per, e.g., its TSC bits), and/or with packets whose PUSI bits indicate that the packet contains a start of a frame, and/or with ECM packets.

Playback Phase:

FIG. 4 shows the logic for using the above-discussed data structures to play back the content, including for trick modes, assuming that the viewer/user has paid for or otherwise acquired the necessary key decryption information. Using this information, the keys in the table are decrypted in a batch or just in time as they are needed in accordance with key decryption principles known in the art.

In general, two playback methods may be used. In a first method, the stream is reconstituted by inserting into the stream substitute ECM packets that are built on-the-fly using the appropriate keys in the table. This permits using an unmodified decoder module with embedded decryption downstream to process the content, as though the original ECM packets had never been stripped from the stream in the first place. In the second method, the key data in the above-described table is fed directly to the decryption module, which has been modified appropriately to use direct-feed keys from the table in lieu of looking for ECM packets.

In either case, the appropriate key or keys must first be obtained from the key table. Accordingly, commencing at block 36, the transport stream that was stored in accordance with FIG. 2 is accessed, and for a packet under test the start-of-frame bits (e.g., PUSI or RAI) can be examined to determine whether the packet contains the start of a video frame. The transport stream is reconstituted starting at packets that represent the beginning of frames, so that trick mode playback (if requested) is better facilitated. Use of the PUSI/RAI bits speeds up searching for jump points in the content. Once the desired jump point has been identified using the table, the content index entry can be used to access the data/content store 22.

Moving to block 38, the sequence number of the packet to be played is used as entering argument to the stored key table to obtain the key pertaining to the packet(s) under test. The keys can be encrypted as mentioned above, in which case they are decrypted and then used to decrypt the content to which they pertain.

For ease of subsequent disclosure, the packets that have been decrypted and played thus far in the logic may be thought of as a current sequence and the packets that are about to be decrypted and played from the stored stream can be thought of as a new sequence. The new sequence could begin anywhere in the content when taking advantage of trick modes.

The above process is repeated to find the proper keys to send to the decrypter to decrypt the content as long as the user does not jump over an ECM key change (as indicated by the table of FIG. 3) to another portion of the stream using trick modes, as indicated by block 39. Assuming that such a jump has been input, however, the logic proceeds to decision diamond 40, wherein it is determined whether the key to be used to decrypt the first packet of the new sequence (i.e., the key that was just obtained from the table) has the opposite polarity as the last packet of the current sequence. If no polarity change is indicated, the logic proceeds to block 42, wherein a flag is set to cause the polarity bit of subsequent packets to be inverted. From block 42, or from decision diamond 40 if a polarity change has been detected, the logic moves to block 44, wherein the new key can be inserted into either a reconstituted ECM packet (in accordance with "method one" discussed above) or directly into a decryption module ("method two"). Block 46 indicates that the logic continues until a sequence break that requires the above-described polarity flag to be toggled again. The polarity change is necessary to signal the decrypter of the jump, which would otherwise be unaware of it.

It may now be appreciated that the key table permits content to be selected at random from the data store (in, e.g., "trick modes") and directly correlated to the appropriate key. Furthermore, using "method one", keys can be built into ECM packets and then inserted into the new reconstituted stream so that the key is available to an unmodified decryption module of the system in sufficient time to effect decryption.

While the particular METHOD AND SYSTEM FOR KEY INSERTION FOR STORED ENCRYPTED CONTENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

I claim:

1. A method for playing content embodied in a transport stream, at least portions of the content being received in an encrypted form, comprising:
    establishing at least one table of keys received in the transport stream;
    for at least one packet of the transport stream, decrypting the packet and playing the packet at least in part by:
        accessing the table to identify at least one key associated with the packet; and
        using the key to decrypt the content, wherein the keys are contained in packets in the transport stream, and the method comprises stripping the keys from packets and placing the keys in the table.

2. The method of claim 1, further comprising displaying the content on an output device.

3. The method of claim 1, wherein the keys are contained in packets.

4. The method of claim 1, wherein the keys are encrypted, and the keys are decrypted after the act of accessing the table and prior to using the keys to decrypt the content.

5. The method of claim 1, wherein the transport stream is composed of packets, each packet being one hundred eighty eight (188) bytes in length.

6. The method of claim 1, wherein the table includes encryption-indicating bits received in headers of packets of the transport stream.

7. The method of claim 1, wherein the table is accessed at least in part based on at least one start-of-frame indicating bit associated with the packet sought to be decrypted, to facilitate trick mode playback.

8. The method of claim 6, comprising:
    receiving a user-initiated trick mode jump from a first video packet to a second video packet;
    changing the polarity of at least some encryption-indicating bits following the second packet if the encryption-indicating bits associated with the first packet indicate the same key polarity as the encryption-indicating bits associated with the second packet.

9. A playback device, comprising:
    at least one content store configured for holding encrypted content, the content including a transport stream of content data packets, at least one packet containing at least one key; and
    at least one processor accessing the store and programmed with logic to:
        arrange the key in a key table; and
        link keys in the table with key changes in the transport stream, to facilitate subsequent decryption and playback of the content.

10. The device of claim 9, wherein the header contains at least one encryption-indicating bit, and the processor:
  establishes at least one index cable indicating changes in encryption-indicating bits in the transport stream, entries in the index table being correlated to keys in the table;
  decrypts the packet and plays the packet at least in part by:
    accessing the index table to identify at least one key associated with the packet; and
    using the at least one key to decrypt the content.

11. The device of claim 9, wherein the processor displays the content on an output device.

12. The device of claim 9, wherein the keys are contained in packets.

13. The device of claim 9, wherein the keys are contained in packets in the transport scream, and the processor strips the keys from packets.

14. The device of claim 9, wherein the keys are encrypted, and the processor decrypts the keys after accessing the table and prior to using the keys to decrypt the content.

15. The device of claim 9, wherein the transport stream is composed of packets, each packet being one hundred eighty eight (188) bytes in length.

16. The device of claim 9, wherein the encryption-indicating bits are in headers of packets of the transport stream.

17. The device of claim 9, wherein the table is accessed at least in part based on at least one start-of-frame indicating bit associated with the packet sought to be decrypted, to facilitate trick mode playback.

18. The device of claim 16, comprising:
  means for receiving a user-initiated trick mode jump from a first video packet to a second video packet; and
  means for changing the polarity of at least some encryption-indicating bits following the second packet if the encryption-indicating bits associated with the first packet indicate the same key polarity as the encryption-indicating bits associated with the second packet.

19. A system for providing to viewers trick playback of encrypted content, comprising:
  at least one content provider transmitting at least one encrypted transport stream;
  at least one viewer device receiving the transport stream, stripping encryption keys therefrom, and linking the keys to corresponding packets of the transport stream, such that subsequent decryption and trick mode playback is facilitated.

20. The system of claim 19, wherein the transport stream includes key packets containing keys, the keys being arranged in a key table subsequent to being stripped from the packets.

21. The system of claim 20, wherein at least one header contains at least one encryption-indicating bit, and the viewer device includes means for indicating changes in encryption-indicating bits in the table.

22. The system of claim 21, wherein the device decrypts the packet and plays the packet by accessing the table to identify at least one key associated with the packet, decrypting the key, and using the key to decrypt the concern.

23. The system of claim 21, wherein the transport stream is composed of packets, each packet being one hundred eighty eight (188) bytes in length.

24. The system of claim 21, wherein the table is accessed at least in part based on at least one start-of-frame indicating bit associated with the packet sought to be decrypted.

25. A computer program device, comprising:
  means for establishing at least one table of keys received in a transport stream:
  means for linking the keys to changes in encryption-indicating bits in the transport stream;
  means for, for at least one packet of the transport stream, decrypting the packet and playing the packet at least in part by:
    accessing the table to identify at least one key associated with the packet; and
    using the at least one key to decrypt the content.

26. The computer program device of claim 25, further comprising means for displaying the content on an output device.

27. The computer program device of claim 25, wherein the keys are contained in packets.

28. The computer program device of claim 25, wherein the keys are contained in packets in the transport stream, and the computer program device comprises means for stripping the keys from packets and placing the keys in the table.

29. The computer program device of claim 27, wherein the keys are encrypted, and the device includes means for decrypting the keys.

30. The computer program device of claim 27, comprising means for accessing the table at least in part based on at least one start-of-frame indicating bit associated with the packet sought to be decrypted.

* * * * *